Jan. 17, 1956  A. M. J. F. MICHELS  2,731,192

PISTON AND CYLINDER MECHANISM

Filed March 28, 1955

Inventor
Antonius M. J. F. Michels
By Cushman, Darby & Cushman
Attorneys

United States Patent Office 2,731,192
Patented Jan. 17, 1956

2,731,192

PISTON AND CYLINDER MECHANISM

Antonius M. J. F. Michels, Amsterdam, Netherlands, assignor to Stamicarbon N. V., Heerlen, Netherlands Application March 28, 1955, Serial No. 497,331

5 Claims. (Cl. 230—21)

The present invention relates to a piston and cylinder mechanism, and, more particularly, to means for providing a seal between a piston and a cylinder in which it reciprocates.

In mechanisms used for pumping poisonous, obnoxious smelling or expensive fluids, or used in the compression of gases to high pressures, it is desirable to employ a liquid seal between the piston and cylinder so as to insure effective sealing of the cylinder with respect to the surrounding atmosphere.

An object of the present invention is to avoid any leakage of the sealing liquid into the working cylinder which would result in contamination of the fluid being pumped. Ancillary to the preceding object, it is a further object of the present invention to provide a system wherein the fluid being pumped will not leak into the liquid sealing system thereby influencing the working stroke of the piston.

Another object of the present invention is to provide a piston and cylinder mechanism wherein a floating piston is utilized in the cylinder mechanism and a liquid piston seal is provided in which leakage of the sealing liquid into the working cylinder or leakage of the fluid substance being pumped or compressed into the sealing system is substantially eliminated.

Still a further object of the present invention is to provide a piston and cylinder mechanism in which any leakage of the sealing liquid is compensated for by admission of the additional sealing liquid when the piston approaches its bottom dead center position.

Another object of the present invention is to provide a piston and cylinder mechanism wherein the compression ratio and the final pressure of the medium being compressed can be simply and easily adjusted.

These and other objects of the present invention will be more apparent from the following specification, claims and drawing wherein:

Figure 1a is a longitudinal cross-sectional view of the upper portion of a compressor embodying the present invention;

Figure 1b is a longitudinal cross-sectional view of the lower portion of the compressor shown in Figure 1a; and Figure 2 is a cross-sectional view taken on the line II—II of Figure 1b.

Figures 1A, 1B, 2:
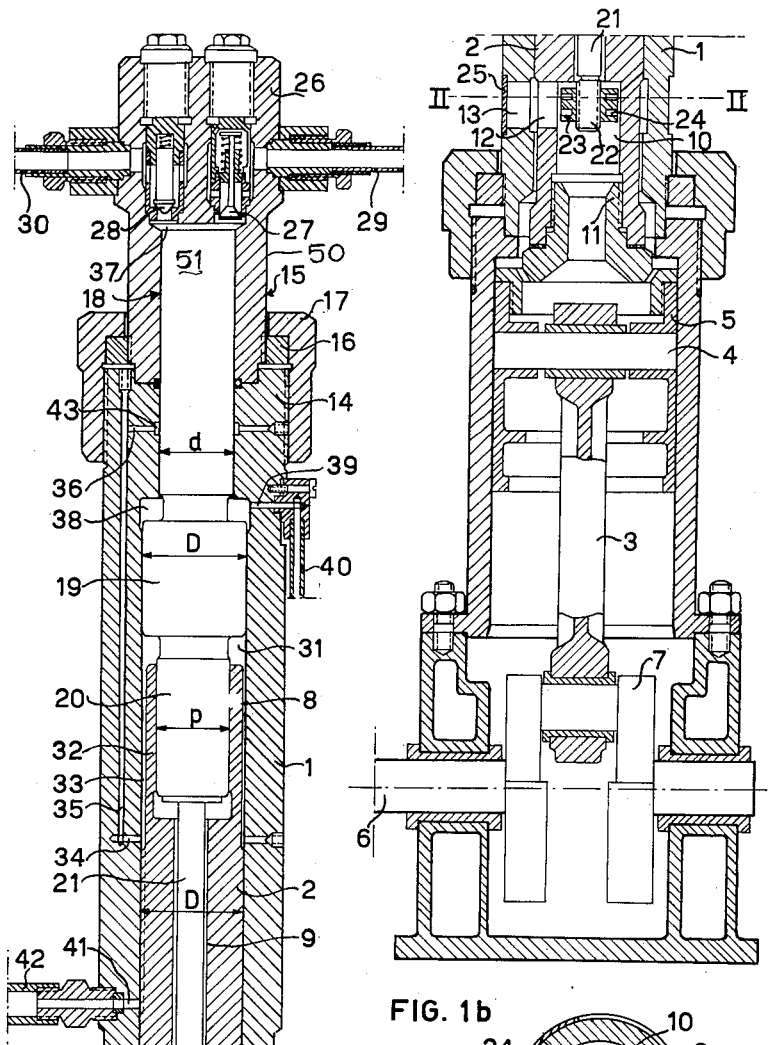

Referring now to the drawings wherein like reference numerals or characters represent like or similar parts, the mechanism of the present invention is shown in connection with a compressor and includes the utilization of a driven piston 2 and a floating piston 18, the floating piston being directly exposed to the pressure of a working cylinder 15. A liquid seal system employing a body of liquid in a space or annular chamber 31 between the driven piston and the floating piston 18 is subjected at all times to substantially the same pressure at which the floating piston 18 develops in working cylinder 15. Suitable passages extend from the space or annular chamber 31 to a groove 43 in the working cylinder 15 and around floating piston 18. The pressure of sealing fluid developed in chamber 31 will be transmitted through the passages to the groove 43 and, thus, provides a seal between working cylinder 15 and the floating piston 18.

Referring now in more detail to the drawings, it will be noted that driven piston 2 is housed in an elongated cylinder 1 having a diameter D. Piston 2 is reciprocated in cylinder 1 by a piston rod 3 which in turn is coupled by a pin 4 to a guide shoe 5 connected to the lower end of the piston by means of a coupling element 11. A crank 7, mounted on a shaft 6 may be driven by a motor or any other suitable source of power (not shown).

The head of driven piston 2 is provided with a bore 8 having a diameter $p$, the bore 8 leading to a smaller longitudinal bore 9 which terminates at the lower end of the piston into a wider bore 10. Bore 10 is threaded so as to receive the coupling element 11 which couples piston 2 to the guide shoe 5.

At the position where the bore 9 opens into bore 10, a lateral opening 12 is provided in the wall of the piston and another lateral opening 13 is provided in the wall of cylinder 1, the openings 12 and 13 being in registry during at least one portion of the stroke of the piston 2. The purpose of openings 12 and 13 will be discussed in more detail later in the specification.

The upper end portion 14 of cylinder 1 is externally threaded and is provided with a bore having a reduced diameter $d$ which is smaller than the inner diameter D of the cylinder in which driven piston 2 reciprocates. The end portion 14 of cylinder 1 having the reduced diameter $d$ forms a part of the working cylinder generally indicated by the numeral 15. The upper section of the working cylinder 15 is formed by a cylindrical element 50 which is externally threaded at its lower end and provided with a threaded ring 16 thereon. Ring 16 is covered by a screw cap 17 threaded onto the end 14 of cylinder 1, the screw cap 17 clamping the element 50 to cylinder 1 so as to form the cylinder 15 with a reduced diameter $d$.

The floating piston 18 is provided with a head portion 51 having a diameter $d$ which is adapted to reciprocate in the bore of working cylinder 15. An intermediate or following portion 19 of floating piston 18 has a diameter D, which forms a piston in the upper end of cylinder 1. A guide pin 20 having a diameter $p$ extends from the free end of the intermediate portion 19 and makes an accurate sliding fit in the bore 8 of driven piston 2. A rod 21 extends from the free end of pin 20 and passes through the bore 9 with a wide clearance. The lower end of rod 21 is externally threaded forming a bolt 22 on which a nut 23 is located. The nut 23 will be located on the level of the opening 12 in piston 2 and its diameter is larger than the diameter of bore 9 so that the nut forms a stop, limiting movement of the floating piston relative to the driven piston in one direction.

As will be noted in Figure 2, nut 23 is provided with a plurality of radially extending holes 24, these holes providing openings through which a tool can be inserted to thread the nut on and off of the bolt 22. The tool can be inserted through openings 13 and 12 when in alignment and when a cover 25 has been removed.

The upper end of working cylinder 15 is closed by a cylinder head 26 having a suction valve 27 and a delivery valve 28. Suction valve 27 connects to a suction conduit 29 whereas delivery valve 28 connects to a suitable delivery conduit 30.

As previously mentioned, the space or annular chamber 31 formed between the portion 19 of floating piston 18 and the head of driven piston 2 is filled with a sealing liquid such as oil or the like. The head portion 32 of driven piston 2 is of slightly reduced outside diameter so as to define with the cylinder wall, a narrow annular space 33. Space 33 communicates at one end with chamber 31, whereas its other end communicates with ports 34, 35 and 36 in the wall of cylinder 1. Bore 36 leads into the sealing groove 43 in working cylinder 15 and surrounds the head 51 of floating piston 18.

Pin 20 is of such cross-sectional dimension in relation to the cross-sectional dimension of the portion 19 that the area of the end face of the portion surrounding the pin $$\left(\frac{\pi}{4}(D^2-p^2)\right)$$

is equal to the area of the head of the floating piston $$\left(\frac{\pi}{4}d^2\right)$$

By providing the aforementioned areas with such a relationship to each other, the pressure of the sealing liquid in chamber 31 is, at any moment, equal to the pressure of the fluid being pumped in working cylinder 15, and as a result there is little or no tendency for the sealing liquid to enter the working cylinder 15 or for the fluid being compressed in the working cylinder to leak past the liquid seal at 43 between the cylinder and piston 18. An example of areas which would give the aforementioned results would be as follows: $d=40$ mm., $D=50$ mm., and $p=30$ mm.

At the junction of the cylinder 1 and working cylinder 15, the cylinders, with the floating piston 18, define a space or annular chamber 38. A bore 39 in the wall of cylinder 1 communicates with the space 38. A conduit 40 connected to the outer end of bore 39 communicates with atmosphere or, if desired, it may lead to a tank for collecting any fluid which may leak past the piston head 51 or the intermediate portion 19 of the floating piston 18.

At the lower end of cylinder 1 is a laterally extending bore 41 connected to a conduit 42 through which oil may be fed under pressure. The reduced end portion 32 of driven piston 2 is of such length that communication may be established between the bore 41 and the space or chamber 33 when the driven piston 2 reaches a point a short distance from the bottom dead center of its stroke as shown in the dotted lines in Figure 1a. At this time a hydraulic coupling between the driven and the floating piston is disconnected so that only the driven piston will continue to move downwardly, liquid being fed through conduit 41 into the space 31 until the lag of the floating piston 18 is checked by the abutment of stop nut 23 against the piston 2. When the stop nut 23 hits the piston 2, the floating piston is then again moved downwardly with the driven piston.

After the piston 2 and the floating piston 18 have reached bottom dead center, they immediately begin to move upwardly. As the pressure of the sealing liquid in the space 31 is at that moment somewhat higher than the pressure in the working cylinder, even in the case where the opening 41 is not yet closed by the driven piston, no oil or liquid will flow back through this opening, and the stop nut 23 will stay firmly in contact with piston 2.

As previously stated, the volume of the sealing liquids in chamber or space 31 is determined by the position of the stop nut 23 on the bolt 22. Because of the compression of oil and possible leakage, this volume will be somewhat smaller when the piston is in the upper dead center position and, therefore, there will be a slight gap between the stop nut 23 and the driven piston 2 when the piston is in its uppermost position as shown in Figure 1b of the drawing. However, leakage is very small and is compensated for by the admission of additional sealing liquid through the conduit 42 when the driven piston 2 approaches its bottom dead center position as described above.

Adjustment of nut 23 by inserting a tool through aligned openings 12 and 13 into the holes 24 will not only adjust the capacity of space 31, but will also adjust the stroke of piston 18 and the compression ratio of the working cylinder.

Although in the preferred embodiment of the invention, conduits 34, 35 and 36, are disclosed in the wall of the cylinder, it would be well within the scope of invention to position the conduits in the floating piston and connect them to a sealing groove provided in the piston.

The terminology used in this specification is for the purpose of description and not limitation, the scope of the invention being defined in the claims.

I claim:

1. In a mechanism of the character described, a cylinder having a longitudinal bore therethrough, a driven piston reciprocably movable in the bore of said cylinder, said piston having a longitudinal counterbore in its head, means to reciprocate said piston in the bore of said cylinder, a working cylinder having a bore therethrough of less diameter than the bore of said first mentioned cylinder, the bore of said working cylinder being in longitudinal alignment with the bore of said first mentioned cylinder, a floating member, said floating member having an end portion reciprocable in the bore of said working cylinder and forming a piston therein and a following portion of larger diameter than the end portion and forming a piston in the bore of said first mentioned cylinder above said driven piston, a guide pin extending from the free end of said following portion into the bore in the head of said driven piston, said guide pin having a cross-sectional dimension relative to a cross-sectional dimension of said following portion so that the area of the free end of said following portion surrounding said guide pin is substantially equal to the area of the head of the end portion of said floating member, the free ends of said following portion and said driven piston defining a space for a sealing liquid, means for connecting said last mentioned space with a space between the working cylinder and the head of said floating member.

2. A mechanism of the type described in claim 1 wherein said guide pin is provided with an extension passing through said driven piston, stop means connected to the free end of said extension and limiting the movement of said floating member relative to said driven piston, and means operable during a portion of the stroke of said driven piston for supplying liquid to the sealing liquid space in said first cylinder between said driven piston and said floating member.

3. A device of the type described in claim 2 wherein the outside diameter of a portion of the head of said driven piston is slightly smaller than the diameter of the bore of said first mentioned cylinder, said smaller portion of the head of said driven piston and the bore of said first mentioned cylinder defining a conduit for supplying additional sealing liquid to the space in said first mentioned cylinder between said driven piston and said floating member, said conduit being in communication with said means for supplying the sealing liquid when said driven piston is near its bottom dead center position.

4. A device of the type described in claim 2 wherein said stop means is adjustable.

5. A device of the type described in claim 4 wherein said driven piston and said first mentioned cylinder are provided with lateral openings, said openings adapted to be in registry during a portion of the stroke of said driven piston, thereby giving access to said stop means for adjustment.

No references cited.